Nov. 7, 1950     N. PETRAS     2,528,970
ROTARY VALVE INTERNAL-COMBUSTION ENGINE
Filed March 23, 1948
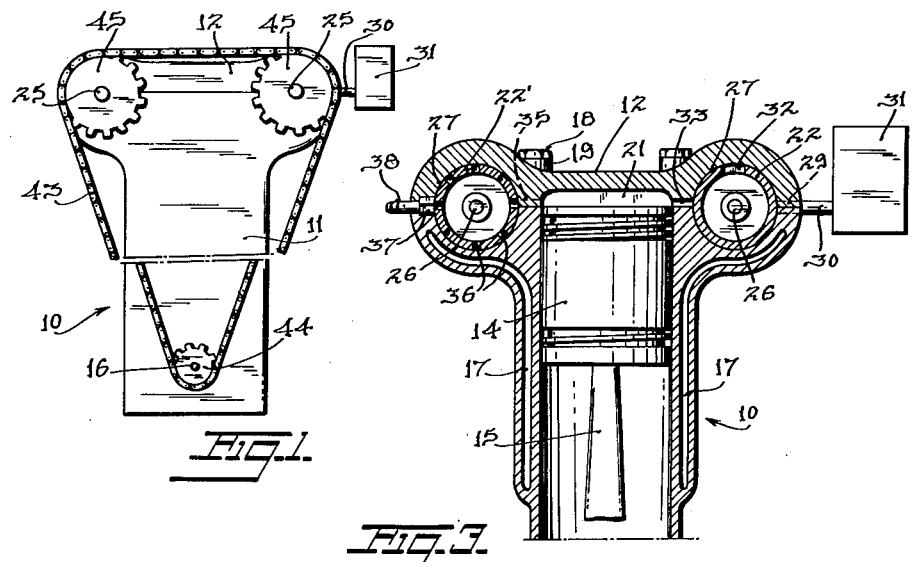
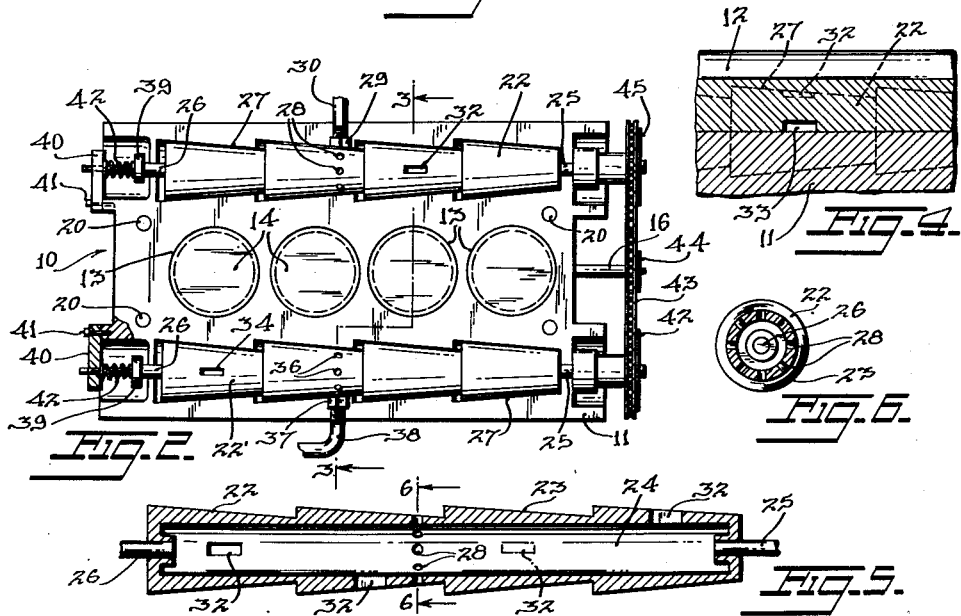
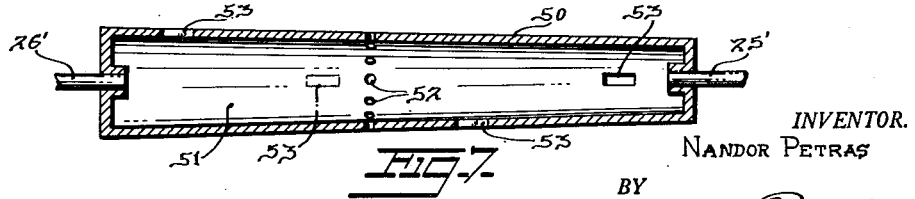
INVENTOR.
NANDOR PETRAS
BY
*Zoltan Holachek*
ATTORNEY Patented Nov. 7, 1950

2,528,970

UNITED STATES PATENT OFFICE 2,528,970

ROTARY VALVE INTERNAL-COMBUSTION ENGINE

Nandor Petras, Jackson Heights, N. Y.

Application March 23, 1948, Serial No. 16,538

1 Claim. (Cl. 123—59)

This invention relates to an improved valve construction for internal combustion engines of the spark ignition type and of the Diesel compression ignition type.

One of the objects of the invention is to provide an engine with a rotary intake valve for the cylinder and a separate rotary exhaust valve for the cylinder, and means for operating the rotary valves in timed relation to the movement of the pistons of the cylinders.

Another object of the invention is to provide a rotary valve construction for an internal combustion engine, having a hollow body having appropriately located openings for controlling the flow of combustible mixtures to the cylinders and the flow of discharge gases from the cylinders.

A further object of the invention is the provision of an internal combustion engine having a rotary valve element formed with a series of conical sections for the intake side of the engine, and a similar rotary valve element formed with a series of conical sections for the exhaust side of the engine, all of the conical valve sections for either side of the engine being mounted to turn between the cylinder block and the head block which is clamped to the cylinder block.

A further object of the invention is to provide a rotary valve construction, wherein the fuel charge is admitted through numerous openings formed in one of the conical valve sections of the valve element located on the intake side of the engine to be preheated in the hollow valve and then be discharged to the cylinder, at the proper time period on the suction stroke of the piston.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Fig. 1 is an end elevational view of an internal combustion engine or the like engine constructed in accordance with the present invention.

Fig. 2 is a plan view of the engine shown in Fig. 1 with the head block removed and having a portion thereof in section revealing interior construction.

Fig. 3 is an enlarged vertical sectional view of the engine assembled and taken substantially on the line 3—3 of Fig. 2.

Fig. 4 is an enlarged partial vertical sectional view showing one of the passages connecting the intake valve with the engine cylinder.

Fig. 5 is a longitudinal sectional view of one of the rotary valves.

Fig. 6 is a sectional view taken on the line 6—6 of Fig. 5.

Fig. 7 is a longitudinal sectional view similar to Fig. 5, but illustrating a modification of the invention.

Referring now to the drawing, the numeral 10 designates an internal combustion or similar type of engine having the usual cylinder block 11 and head block 12. The cylinder block 11 is formed with the usual cylinder openings 13 housing pistons 14 in a manner to reciprocate vertically in the openings 13. The pistons are connected by means of the usual piston rods 15 to the crankshaft 16. The specific connection between the rods 15 and the shaft 16 is not shown on the drawings, as this connection forms no part of the present invention.

Further, the cylinder block 11 is formed with the usual passages 17 for the circulation of a cooling medium.

The head block 12 rests on the cylinder block 11 and is secured in position by the usual bolts 18 which pass through bosses 19 formed on the head block 12 and into threaded openings 20 formed in the cylinder block 11. In addition, the head block 12 is formed with a recess 21 extended inwards from its bottom face for each of the cylinder openings 13 and located immediately thereabove.

On the drawing, the present invention is shown in connection with a four cylinder engine, but this should not be construed as limiting, as the present invention is applicable to engines having more or less than four cylinders; for example, its application to engines having six, eight and twelve cylinders will be apparent to those skilled in the art.

Disposed along one side of the engine 10 is a rotary intake valve 22 and disposed along the other side of the engine is a rotary exhaust valve 22'. These rotary valves 22 and 22' are alike in construction, the only difference being that one functions to supply the explosive mixture to the cylinders 13 while the other functions to carry exhaust gases from the cylinders.

As shown in Figs. 2 and 5, the rotary valves each are constructed of a series of frusto-conically shaped sections 23 arranged in end alignment and connected by a continuous internal chamber 24. The ends of the rotary valves 22 and 22' are provided with stud shafts 25 and 26. Referring now to Figs. 2 and 3, the rotary valves 22 and 22' are received in openings 27 extended along the sides of the engine 10 and formed partially in the cylinder block 11 and partially in the head block 12. The openings 27 having a configuration corresponding to the external configuration of the rotary valves 22 and 22', and when the head block 12 is removed as shown in Fig. 2, the valves are adapted to be nested in the portion of the openings 27 formed in the cylinder block 11, so that when the head block 12 is returned to its position on the cylinder block, the rotary valves will be enclosed between blocks 11 and 12. The sections of the openings 27, see Fig. 2, are slightly longer than the respective sections 23 of the rotary valves to allow for expansion of the parts upon heating up of the engine.

At one point along its length the intake valve 22 is formed with series of intake holes 28 in alignment with an opening 29 between the adjacent faces of the cylinder block 11 and the head block 12. The opening 29 is adapted to receive the threaded tubular stem 30 of a conventional carburetor 31. The combustible mixture from the carburetor 31 will pass through the tubular stem 30, the opening 29, and through the intake holes 28 to the interior chamber 24 of the intake valve 22. The combustible mixture will be preheated in the chamber 24 of the rotary intake valve 22 prior to being fed into the engine cylinders 13, and with this construction the usual intake manifold is eliminated and the carburetor 31 is connected directly to supply the intake valve.

Longitudinally and circumferentially spaced discharge ports 32 are formed on the intake valve 22 at spaced points, to successively connect with a series of discharge passages 33 formed in the head block 12. The discharge passages 33, in turn, connect with the recesses 21 formed in the head block 12, which as previously described are in communication with the engine cylinders 13. The relationship between the discharge ports 32 and the discharge passages 33 is such that the ports 32 will be successively aligned with their respective passages 33 only on the intake stroke of its respective piston to supply the respective cylinder with the required combustible mixture for operation of the engine.

The exhaust valve 22' is likewise formed with a plurality of longitudinally and circumferentially spaced ports 34 arranged to be successively aligned with passages 35, formed in the bottom face of the head block 12, on the exhaust strokes of the pistons 14 to discharge the exhaust gases into the chamber 24 of the exhaust valve 22'. The passages 35 are in communication with the recesses 21 formed in the bottom face of the head block 12.

At one point the exhaust valve 22' is formed with a series of holes 36 in alignment with an opening 37 adapted to threadedly receive an exhaust pipe 38, for carrying the exhaust gases from the interior chamber 24 of the exhaust valve 22'.

The stud shafts 26 of the valves 22 and 22' are extended at the rear ends of the engine 10, and means is provided on those stud shafts 26 for resiliently urging the valves 22 and 22' forward into proper facial engagement with their respective openings 27. This means includes collars mounted on the inner ends of the stud shafts 26. The outer ends of the stud shafts 26 slidably extend through openings formed in brackets 40 attached to the back of the engine 10 by bolts 41. Expansion springs 42 are coaxially mounted on the stud shafts 26 and operate between the collars 39 and the brackets 40 to urge the valves 22 and 22' into proper engagement with the wall of the openings 27.

The rotation of the valves 22 and 22' is controlled by a chain 43 driven by a sprocket 44 mounted on the extended end of the engine crank shaft 16. The chain 43 in turn engages over complementary sprockets 45 mounted on the extended ends of the stud shafts 25 of the valves 22 and 22'.

The rotary valves 22 and 22' are positioned in their respective openings 27, so that the discharge ports 32 of the intake valve 22 will align with their respective discharge passages 33 only on the intake stroke pistons and so that the ports 34 of the exhaust valve 22' will align with their respective passages 35 only on the exhaust stroke of the pistons 14. As a chain drive is provided for rotating the valve members 22 and 22' this timing of the valves will be maintained at all times. For proper operation of the engine, the sprockets 45 on the stud shafts 25 should be twice as large as the sprocket 44 on the crankshaft 16.

In Fig. 7 of the drawing, a modified type of rotary intake or exhaust valve 50 is shown. The valve 50 is tapered from one end to the other and has an internal chamber 51 and is provided at its ends with shafts 25' and 26' by which it can be rotatively supported. The valve 50 is provided with a series of holes 52 extended about the valve 50 at one point and is further provided with longitudinally and circumferentially spaced ports 53 arranged about the valve 50. The substitution of valves, such as the valve 50, for the valves 22 and 22' in the previous form of the invention will be apparent to those skilled in the art, and further details of this form of the invention will not be given in this specification.

It is to be understood that any type of lubricating arrangement may be used in connection with this engine construction.

While I have illustrated and described the preferred embodiments of my invention, it is to be understood that I do not limit myself to the precise construction herein disclosed and the right is reserved to all changes and modifications coming within the scope of the invention, as defined in the appended claim.

Having thus described my invention, what I claim as new and desire to secure by United States Letters Patent is:

In an internal combustion engine having an engine block formed with a series of open topped cylinders closed by a head secured in position on top of the engine block, the head and the block having in their meeting faces on opposite sides of the cylinders openings sub-divided into a plurality of aligned frusto-conical sections in direct end contact with one another, said openings having laterally aligned frusto-conical sections for each of the cylinders, the head being formed with intake passageways extending between the frusto-conical sections of one of the openings and the cylinders, the head being formed with exhaust passageways extending between the frusto-conical sections of the other of the openings and the cylinders, a rotary valve in each of said openings, each valve being sub-divided into a plurality of aligned frusto-conical sections in direct end contact with each other and located one in each of the frusto-conical sections of the respective opening, each of the frusto-conical sections of said rotary valves having a port placed to pass the respective passageway on each complete revolution of the respective rotary valve, and resilient means urging said rotary valves axial in a direction to maintain the outer faces of the frusto-conical sections of said valves in facial contact with the surfaces of the frusto-conical sections of the openings, the frusto-conical sections of said openings being larger than the frusto-conical sections of said rotary valves providing a slight clearance for axial movement of said valves within said openings under the influence of said resilient means.

NANDOR PETRAS.

REFERENCES CITED

The following references are of record in the file of this patent:

UNITED STATES PATENTS

| Number | Name | Date |
| --- | --- | --- |
| 1,191,684 | Fountain et al. | July 18, 1916 |
| 1,241,663 | Ronconi | Oct. 2, 1917 |
| 1,274,080 | Richter | July 30, 1918 |
| 1,326,521 | McNair | Dec. 30, 1919 |
| 1,362,721 | Makowski | Dec. 21, 1920 |
| 1,382,857 | Ronconi | June 28, 1921 |
| 1,794,061 | Culver | Feb. 24, 1931 |